United States Patent Office 3,637,873
Patented Jan. 25, 1972

3,637,873
PROCESS FOR PREPARING ISOCHLOROPRENE
Virgil Dean Hemphill, Wilmington, Del., assignor to E. I. du Pont de Nemours and Company, Wilmington, Del.
No Drawing. Filed Oct. 7, 1968, Ser. No. 765,685
Int. Cl. C07c 21/20
U.S. Cl. 260—655                                4 Claims

ABSTRACT OF THE DISCLOSURE

A process of making isochloroprene by reacting monovinylacetylene with hydrochloric acid in the presence of an aqueous catalyst solution being 0.1 to 4 weight percent cuprous chloride, and 3 to 32 weight percent of at least one chloride from chlorides of the Group I–A metals, Group II–A metals or ammonium chloride.

BACKGROUND OF THE INVENTION (1) Field of the invention

This invention relates to a process of producing isochloroprene (4-chloro-1,2-butadiene).

(2) Description of the prior art

When monovinylacetylene is reacted with hydrochloric acid, chloroprene and isochloroprene are formed. One way of accelerating this reaction is to add cuprous chloride as a catalyst. However, in addition to accelerating the rate of reaction, cuprous chloride catalyzes the isomerization of isochloroprene to chloroprene rendering high yields of chloroprene and only traces of isochloroprene. See W. H. Carothers, G. J. Gerchet and A. M. Collins, Journal of the American Chemical Society, 54, 4066–4070 (1932). Therefore, if it is desirable to achieve practical yields of isochloroprene the removal of cuprous chloride from the reaction appears essential.

In the manufacture of isochloroprene Carothers and Collins in U.S. Pat. 1,950,431 disclosed the use of calcium chloride instead of cuprous chloride as the reaction catalyst attaining yields of approximately 61% isochloroprene. The problem is to find an efficient catalyst to accelerate the reaction of monovinylacetylene and hydrochloric acid and favor the formation of isochloroprene.

SUMMARY OF THE INVENTION

Accordingly, this invention provides a process for preparing isochloroprene which comprises reacting monovinylacetylene with hydrochloric acid in the presence of an aqueous catalyst solution comprising (a) 0.1 to 4% by weight of cuprous chloride, and (b) 3 to 32% by weight of a metal chloride consisting of a chloride of a Group I–A metal, Group II–A metal or ammonium at a temperature between $-10°$ C. and $+30°$ C.

DETAILS OF THE INVENTION

The process of making isochloroprene according to this invention can be carried out as a batch or a continuous process. The batch process is comprised essentially of adding liquid monovinylacetylene from a dropping funnel into a chilled aqueous catalyst solution containing hydrochloric acid. The mixture is thoroughly agitated and chilled. The isochloroprene produced by the reaction remains in the organic phase while the catalyst and excess hydrochloric acid remain in the aqueous phase. Separation and isolation of isochloroprene may be accomplished in a conventional manner. For example, the reaction product can be poured into a separatory funnel where the aqueous layer is drawn off from the organic supernatant liquid. The isochloroprene can be further refined by vacuum distillation.

A continuous process comprises essentially continuously adding monovinylacetylene and hydrogen chloride to a reaction vessel partly filled with catalyst solution. The organic phase which is isochloroprene is separated by a continuous decantation process. The exit gases are passed from the reactor into a condenser and then to a flash still where unreacted monovinylacetylene is removed. The isochloroprene can be further refined by the use of a stripping still and vacuum fractionator. The phrase "comprises essentially" means requiring the specific components enumerated but not excluding others which do not affect the process adversely.

An important aspect in obtaining relatively high yields of isochloroprene from the reaction of monovinylacetylene and hydrochloric acid is the catalyst used. It has been found that the use of a metal chloride from chlorides of Group I–A or Group II–A metals coupled with a small amount of cuprous chloride aids the reaction and provides unexpectedly high yields. A reference to Group I–A and Group II–A metals may be found in the Periodic Chart of the Elements printed in "Advanced Organic Chemistry" by F. A. Cotton and G. Wilkinson, Interscience Publishers, a division of John Wiley & Sons, New York, N.Y. (1962). Usable metal chlorides are $LiCl$, $CaCl_2$, $NaCl$, $KCl$, $MgCl_2$, $BeCl_2$. Ammonium chloride may be used.

The catalyst solution can be made by dissolving in hydrochloric acid (a) 0.1 to 4% and preferably 0.5 to 2.0% of cuprous chloride and (b) 3.0 to 32.0% and preferably an amount sufficient to saturate the catalyst solution of at least one chloride from chlorides of the Group I–A metals, Group II–A metals or ammonium chloride. The percentages are based on the total weight of the catalyst solution. The preferred ranges represent the most efficient catalyst concentrations of this invention.

When hydrochloric acid and monovinylacetylene are combined in the presence of cuprous chloride, chloroprene and isochloroprene are formed. The cuprous chloride acts on the isochloroprene to isomerize it to chloroprene. High concentrations of cuprous chloride and high temperatures favor this isomerization step yielding chloroprene. However, when the concentration of cuprous chloride is between .1 and 4% by weight of the catalyst solution coupled with 3 to 32% by weight of another chloride and the reaction temperature is maintained between $-10$ to $+30°$ C., the reaction is accelerated but the formation of isochloroprene is favored instead of chloroprene. At higher temperatures the yield of isochloroprene is reduced and below $-10°$ C. solubility problems exist and the aqueous solution freezes presenting processing difficulties. The preferred temperature range is 0 to 10° C.

Other factors influencing the yield of isochloroprene are the reaction time and the amount of monovinylacetylene converted. The longer the reaction time, the more monovinylacetylene converted. However, the longer the reaction time the more isochloroprene isomerized to chloroprene. Therefore, the reaction parameters of time and the conversion of monovinylacetylene must be balanced to favor the desired yield of isochloroprene. This is easily performed by one skilled in the art.

The following examples illustrate the invention. All parts, percentages and proportions are by weight unless otherwise indicated.

EXAMPLES 1 TO 5

A batch process is used wherein a 500-ml. reactor is equipped with an air driven, six-blade, glass agitator, a thermometer, a Dry Ice cold finger condenser and a dropping funnel designed to hold liquid monovinylacetylene. The reactor is charged with 200–300 g. of catalyst solution containing 20–37 weight percent of hydrochloric acid. Liquid monovinylacetylene, 4–10 ml., is added from the dropping funnel and the mixture agitated at 50° C. (the boiling point of monovinylacetylene) with the shaft speed of the agitator at 2500 r.p.m. until the reaction proceeds to the desired conversion.

Different catalyst systems are used at various concentrations. The catalyst solution is made up of cuprous chloride, another salt, a 36% solution of HCl and water. After the conversion of monovinylacetylene, the organic phase is separated by decantation from the aqueous phase. A known quantity of benzene is then added to the organic phase to facilitate analysis by gas chromatography. After the analysis, the conversion of monovinylacetylene and yields of isochloroprene, chloroprene and 1,3-dichlorobutene are calculated. Table I below is a tabulation of these experiments.

lithium chloride, sodium chloride, potassium chloride, magnesium chloride or beryllium chloride.

3. The process of claim 1 in which the aqueous catalyst solution comprises essentially (a) 0.5 to 2 weight percent of cuprous chloride and (b) 5 to 10 weight percent of calcium chloride at a temperature between $-5$ and $+5°$ C.

4. The process of claim 1 in which 4-chloro-1,2-butadiene is isolated from the reaction medium by decantation and is thereafter refined by distillation.

TABLE I

| Ex. No. | Total wt., g. | Catalyst solution [1] | | | Vol. monovinylacet-ylene (ml.) | Run time (min.) | Analysis (mole percent) | | | | | |
|---|---|---|---|---|---|---|---|---|---|---|---|---|
| | | Wt. percent $Cu_2Cl_2$ | Wt. percent HCl | Wt. percent salt | | | Conversion mono-vinyl-acetylene | Yield chloro-prene | Yield iso-chloro-prene | Yield di-chloro-butenes | Productivity [2] | |
| | | | | | | | | | | | $P_1$ | $P_2$ |
| 1 | 252 | 0 | 27.6 | 10.8 $CaCl_2$ | 2.0 | 35 | 20.7 | 37.2 | 61.0 | 2.0 | 0.0020 | 0.0019 |
| 2 | 245 | 0.49 | 27.0 | 10.0 $CaCl_2$ | 6.0 | 15 | 24.7 | 42.0 | 58.0 | Trace | 0.017 | 0.017 |
| 3 | 247 | 1.01 | 26.9 | 9.9 $CaCl_2$ | 6.0 | 10 | 30.7 | 51.1 | 48.9 | 0.16 | 0.031 | 0.026 |
| 4 | 249 | 2.00 | 26.6 | 9.8 $CaCl_2$ | 10.0 | 8 | 26.3 | 50.0 | 50.0 | Trace | 0.055 | 0.047 |
| 5 | 245 | 0 | 23.8 | 13.1 LiCl | 2.0 | 40 | 17.7 | 36.7 | 61.6 | 1.8 | 0.0015 | 0.0016 |
| 6 | 249 | 0.50 | 21.3 | 22.5 LiCl | 10.0 | 10 | 47.1 | 24.6 | 75.4 | 0.15 | 0.079 | 0.098 |
| 7 | 247 | 1.01 | 5.94 | 32.7 LiCl | 8.0 | 10 | 3.6 | 34.2 | 65.8 | Trace | 0.0049 | 0.0056 |
| 8 | 249 | 3.86 | 23.2 | 12.2 LiCl | 10.0 | 4 | 34.2 | 56.4 | 43.6 | Trace | 0.14 | 0.10 |

[1] $Cu_2Cl_2$, HCl, salt, and water.
[2] Productivity—$P_1$=Kg. monovinylacetylene/hour, kg. catalyst, one atmosphere of monovinylacetylene; $P_2$=Kg. isochloroprene/hour, kg. catalyst, one atmosphere of monovinylacetylene.

I claim:

1. A process for preparing 4-chloro-1,2-butadiene which comprises essentially reacting monovinylacetylene and hydrochloric acid in the presence of an aqueous catalyst solution comprising (a) 0.1 to 4 weight percent of cuprous chloride, and (b) 3 to 32 weight percent of at least one chloride from chlorides of the Group I-A metals and Group II-A metals at a temperature between $-10°$ C. and $+30°$ C.

2. The process of claim 1 wherein the chloride used in conjunction with cuprous chloride consists of at least one of the following metal chlorides: calcium chloride, References Cited

UNITED STATES PATENTS

| 1,950,431 | 3/1934 | Carothers et al. | 260—655 |
| 1,950,434 | 3/1934 | Dowing et al. | 260—655 |
| 2,178,737 | 11/1939 | Carothers et al. | 260—655 |

OTHER REFERENCES

Carothers et al., JACS, 54, pp. 4066–4070 (1932).

LEON ZITVER, Primary Examiner

J. A. BOSKA, Assistant Examiner